(12) United States Patent
Sashin

(10) Patent No.: US 9,216,458 B2
(45) Date of Patent: Dec. 22, 2015

(54) CUTTING TOOL HAVING ADJUSTABLE INSERT CUTTING ANGLE

(71) Applicant: Iscar, Ltd., Tefen (IL)

(72) Inventor: Alexander Sashin, Nahariya (IL)

(73) Assignee: Iscar, Ltd., Tefen (IL)

(*) Notice: Subject to any disclaimer, the term of this patent is extended or adjusted under 35 U.S.C. 154(b) by 204 days.

(21) Appl. No.: 14/184,431

(22) Filed: Feb. 19, 2014

(65) Prior Publication Data
US 2015/0231705 A1     Aug. 20, 2015

(51) Int. Cl.
*B23B 27/00* (2006.01)
*B23B 27/16* (2006.01)

(52) U.S. Cl.
CPC ......... *B23B 27/1696* (2013.01); *B23B 2205/04* (2013.01); *B23B 2205/12* (2013.01); *B23B 2210/08* (2013.01); *B23B 2260/004* (2013.01); *Y10T 29/49716* (2015.01); *Y10T 407/2246* (2015.01)

(58) Field of Classification Search
CPC ............ B23B 27/1696; B23B 27/1692; B23B 27/1685; B23B 27/1681; B23B 2205/12; B23B 2205/04; B23B 2260/004; B23B 2260/0045; Y10T 407/2246; Y10T 407/2244
See application file for complete search history.

(56) References Cited

U.S. PATENT DOCUMENTS

| | | | | |
|---|---|---|---|---|
| 1,413,326 A | * | 4/1922 | Dover | B23B 27/065 407/10 |
| 1,415,578 A | * | 5/1922 | Knoop | B23B 27/065 407/102 |
| 1,673,039 A | * | 6/1928 | Brown | B23B 27/083 407/64 |
| 2,479,756 A | * | 8/1949 | Mays | B23B 27/1692 407/102 |
| 3,545,061 A | * | 12/1970 | Michael | B23B 27/164 407/103 |
| 4,057,884 A | * | 11/1977 | Suzuki | B23B 27/00 407/89 |
| 4,389,144 A | * | 6/1983 | Sipos | B23B 27/00 407/82 |
| 4,848,977 A | | 7/1989 | Kieninger | |
| 5,913,643 A | | 6/1999 | Fowler et al. | |
| 2012/0251252 A1 | | 10/2012 | Acharya | |

FOREIGN PATENT DOCUMENTS

| | | |
|---|---|---|
| DE | 44 19 668 | 6/1995 |
| DE | 44 36 779 A1 | 4/1996 |
| DE | 196 35 490 A1 | 3/1998 |

OTHER PUBLICATIONS

International Search Report dated pMay 4, 2015 issued in PCT counterpart application (No. PCT/IL2015/050095).

* cited by examiner

*Primary Examiner* — Will Fridie, Jr.
(74) *Attorney, Agent, or Firm* — Womble Carlyle Sandridge & Rice PLLC

(57) ABSTRACT

An adjustable insert cutting angle cutting tool comprising a tool holder having a cartridge receiving pocket, an insert cartridge clamped the cartridge receiving pocket by a clamping member, and a cutting insert removably retained in the insert cartridge. The clamping member is operated by a separate fastening member. The cutting insert has at least one operative cutting portion, and the insert cartridge is oriented in a cartridge receiving pocket of the tool holder so that the operative cutting portion encounters a workpiece at an insert cutting angle. The clamping member has a clamping surface with at least one clamping zone, and the same at least one clamping zone makes contact with a non-planar clamped surface of the insert cartridge for different values of insert cutting angle. The insert cutting angle is increased or decreased by reorienting the insert cartridge in the tool holder, following release of the fastening member.

34 Claims, 5 Drawing Sheets

CUTTING TOOL HAVING ADJUSTABLE INSERT CUTTING ANGLE

FIELD OF THE INVENTION

The present invention relates to an adjustable cutting tool for use in metal cutting processes in general, and for chamfering operations in particular.

BACKGROUND OF THE INVENTION

Within the field of cutting tools used in chamfering operations, chamfering tools are known having a cutting insert pivotally mounted on either a rotatable cylindrical shank or a stationary square shank, capable of cutting a workpiece at a range of chamfer angles.

DE 4419668 discloses a milling tool, particularly for chamfering at different bevel angles, having a cylindrical shaped basic body with a pocket at an end portion thereof for receiving an insert cartridge. A cutting insert is mounted to the insert cartridge and fastened within the pocket by a fastening screw extending through a through bore in the insert cartridge and engaging a threaded bore in the pocket. Two retaining screws connect the insert cartridge to a block, which is slidable along an arcuate groove in the pocket. The insert cartridge can be manually pivoted about the axis of the fastening screw to a selected bevel angle, before the fastening screw and the two retaining screws are tightened to provide three point fixation.

U.S. Pat. No. 5,913,643 discloses an endmill body connected to the end of a rotatable cylindrical shank, the endmill body having a substantially radially-oriented wall, and a mounting assembly for pivotally mounting a cutting insert onto the wall such that a lead angle of the cutting insert's linear cutting edge is angularly adjustable with respect to the outer periphery of the endmill body. The mounting assembly includes a plate-shaped insert cartridge having a pocket for receiving the cutting insert and a pin for pivotally connecting the insert cartridge to the wall, and a locking screw for securing the insert cartridge in a selected pivoted position. The locking screw serves as both a clamp which directly contacts the cartridge and as a fastener which threadingly engages the radially-oriented wall to retain the cartridge.

SUMMARY OF THE INVENTION

In accordance with the present invention, there is provided an adjustable insert cutting angle cutting tool comprising:

a tool holder having a cartridge receiving pocket, an insert cartridge clamped in the cartridge receiving pocket by a clamping member operated by a separate fastening member, and a cutting insert removably retained in the insert cartridge, the cutting insert having at least one operative cutting portion, the insert cartridge oriented in the cartridge receiving pocket so that the operative cutting portion of the cutting insert encounters a workpiece at an insert cutting angle, wherein the clamping member has a clamping surface which makes contact with a non-planar clamped surface of the insert cartridge, wherein the insert cutting angle is increased or decreased by reorienting the insert cartridge in the tool holder, following release of the fastening member, and wherein the clamping surface has at least one clamping zone, and the same at least one clamping zone makes contact with the clamped surface for different values of insert cutting angle.

Also in accordance with the present invention, there is provided a method of increasing or decreasing an insert cutting angle of a cutting tool relative to a workpiece, the cutting tool comprising:

an insert cartridge clamped in a tool holder by a clamping member, and a cutting insert removably retained in the insert cartridge, the clamping member having a clamping surface which makes contact with a non-planar clamped surface of the insert cartridge, the clamping member operated by a separate fastening member, the clamping surface having at least one clamping zone, and the same at least one clamping zone making contact with the clamped surface for different values of insert cutting angle, the cutting insert having at least one cutting portion, and the insert cartridge oriented in a cartridge receiving pocket of the tool holder so that the operative cutting portion encounters a workpiece at the insert cutting angle, the method comprising the steps of:

releasing the fastening member, reorienting the insert cartridge in the cartridge receiving pocket, and retightening the fastener.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
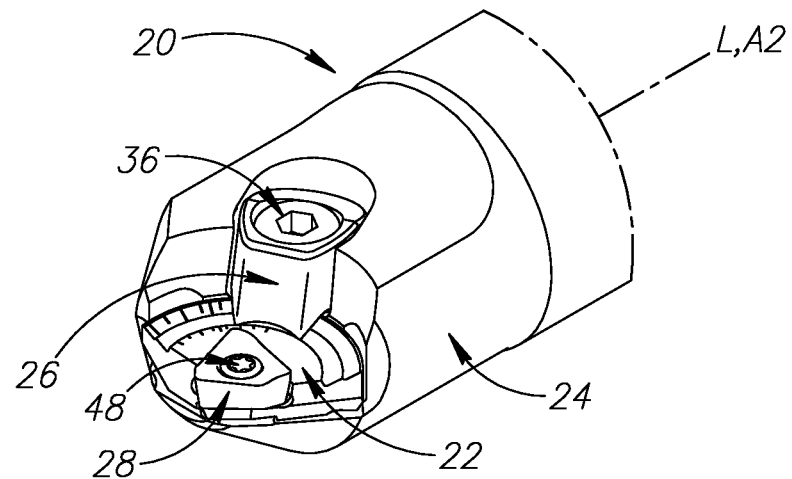
FIG. 1 is a perspective view of a cutting tool in accordance with some embodiments of the present invention.
Figure 2:
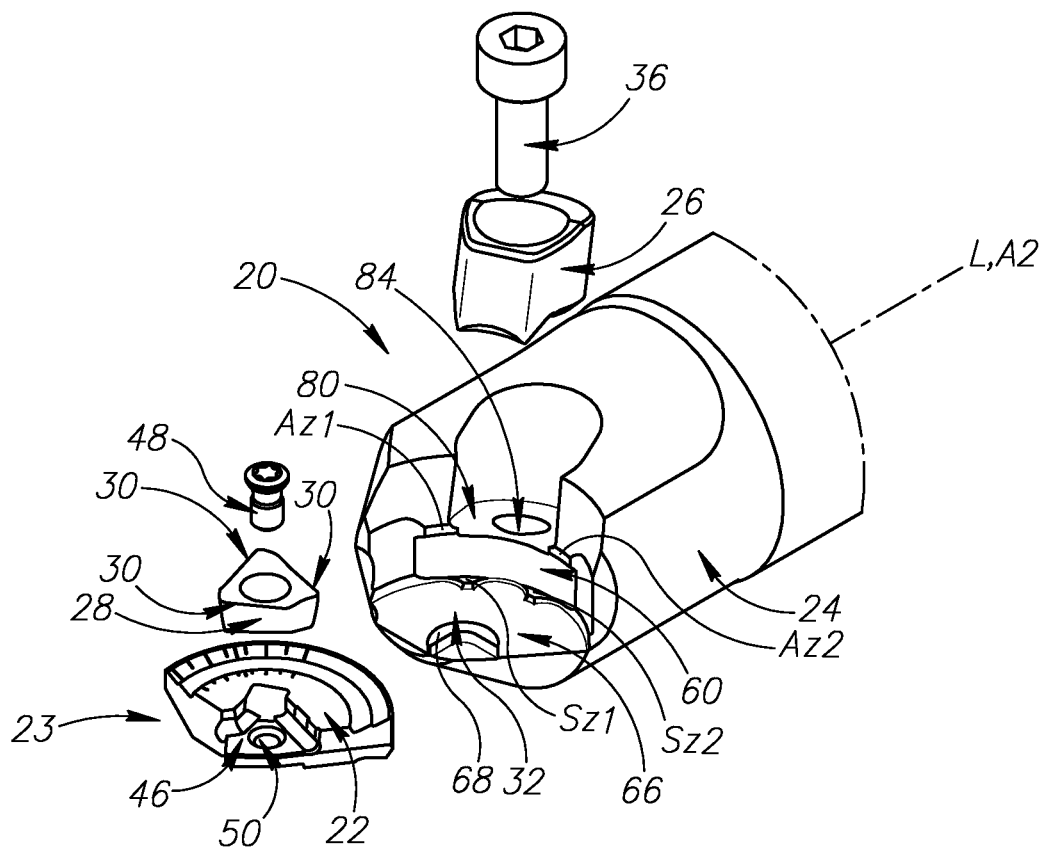
FIG. 2 is an exploded view of the cutting tool shown in FIG. 1.

Attention is first drawn to FIGS. 1 and 2, showing a cutting tool 20 in accordance with some embodiments of the present invention. The cutting tool 20 includes an insert cartridge 22 clamped in a tool holder 24 by a clamping member 26, and a cutting insert 28 removably retained in the insert cartridge 22.

The insert cartridge 22 and cutting insert 28 are collectively referred to as a cutting unit 23. In some embodiments of the cutting unit 23, discussed further below, the cutting insert 28 is removably retained in the insert cartridge 22 by a retaining screw 48. In some embodiments the cutting insert 28 is removably retained in the insert cartridge 22 by brazing.

The cutting insert 28 has at least one cutting portion 30 and may be manufactured by form pressing and sintering a cemented carbide, such as tungsten carbide, and may be coated or uncoated.

Figure 3:
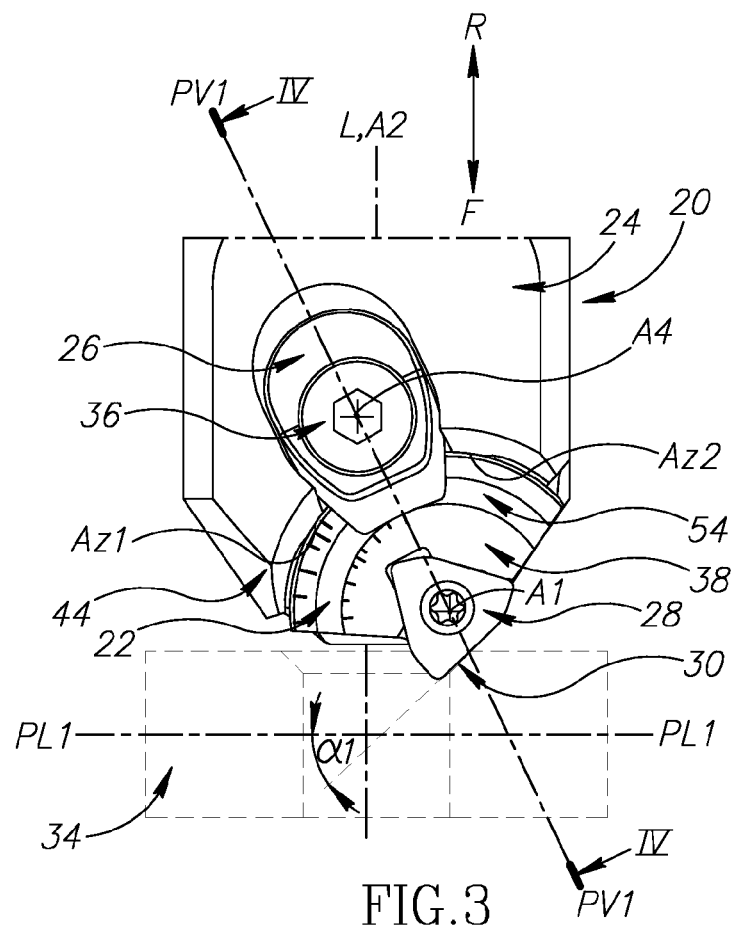
FIG. 3 is a top view of the cutting tool shown in FIG. 1, engaging a workpiece.

As shown in FIG. 3, the insert cartridge 22 is oriented in a cartridge receiving pocket 32 of the tool holder 24 so that the operative cutting portion 30 encounters a workpiece 34 at an insert cutting angle $\alpha 1$.

The clamping member 26 is operated by a separate fastening member 36, and the insert cutting angle $\alpha 1$ is increased or decreased by reorienting the insert cartridge 22 in the tool holder 24, following release of the fastening member 36.

In some embodiments of the present invention, the insert cutting angle $\alpha 1$ may be increased or decreased solely following release of the fastening member 36, and a single fastening member 36 may be used to operate the clamping member 26, thus providing an efficient and operator friendly cutting tool 20.

Also, in some embodiments of the present invention, visual indicators and/or mechanical detents on the insert cartridge 22 may be employed to define distinct step increases or decreases of the insert cutting angle $\alpha 1$, and thus aid the operator.

Further, in some embodiments of the present invention, the insert cutting angle $\alpha 1$ may have an adjustment range of at least 60 degrees.

Yet further, in some embodiments of the present invention, release of the fastening member 36 does not require its removal from the cutting tool 20, and the insert cutting angle $\alpha 1$ may be increased or decreased without removing any components from the cutting tool 20.

A method of increasing or decreasing the insert cutting angle $\alpha 1$ of the cutting tool 20 comprises the steps of:

releasing the fastening member 36, reorienting the insert cartridge 22 in the cartridge receiving pocket 32, and retightening the fastener 36.

In some embodiments of the present invention, the insert cartridge 22 may be manually reoriented by the operator.

Also, in some embodiments of the invention, the fastening member 36 may be the only member to be released and tightened for increasing or decreasing the insert cutting angle $\alpha 1$.

Figure 4:
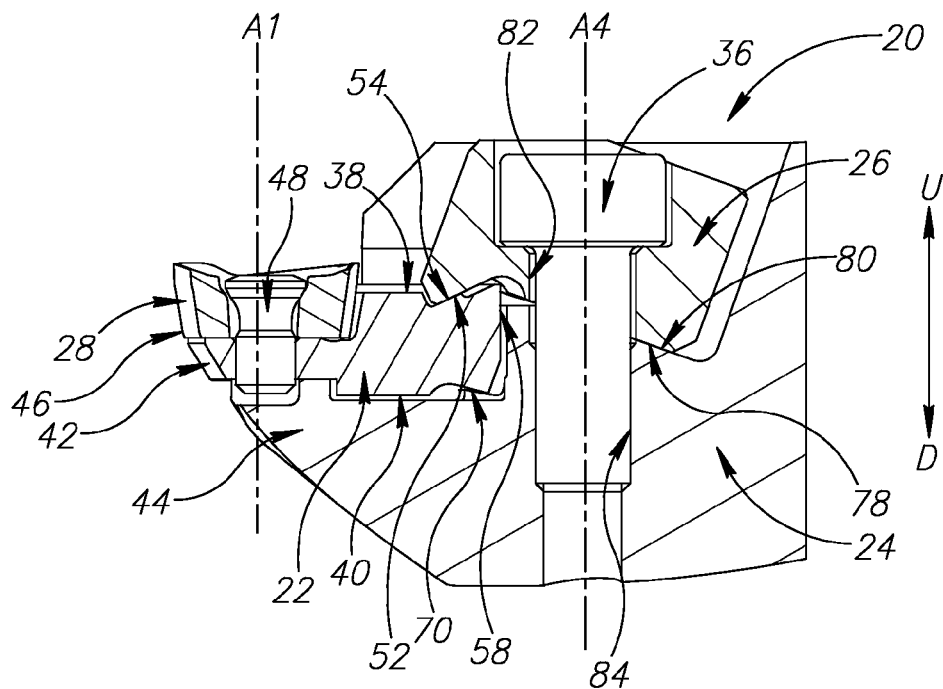
FIG. 4 is cross-sectional view of the cutting tool shown in FIG. 3, taken along the line IV-IV.

As shown in FIG. 4, in a cross-section of the cutting tool 20 taken in a first vertical plane PV1, the insert cartridge 22 has opposing upper and lower surfaces 38, 40 generally facing in upward and downward directions U, D, respectively, and a peripheral surface 42 extending therebetween.

In some embodiments of the present invention, reorientation of the insert cartridge 22 in the cartridge receiving pocket 32 may be performed by rotating the insert cartridge 22 about a pivot axis A1.

Also, in some embodiments of the present invention, the pivot axis A1 may be in a fixed position relative to the tool holder 24.

The pivot axis A1 maintains its fixed position relative to the tool holder 24 during reorientation of the insert cartridge 22, by virtue of the clamping member 26 and the cartridge receiving pocket 32 limiting the insert cartridge's freedom of movement solely to rotation about the pivot axis A1, following fractional release of the fastening member 36.

The pivot axis A1 may be contained in the first vertical plane PV1.

In some embodiments of the present invention, the first vertical plane PV1 may intersect the upper and lower surfaces 38, 40 of the insert cartridge 22.

Also, in some embodiments of the present invention, the clamping member 26 may be located at an identical position relative to the tool holder 24 for different values of insert cutting angle $\alpha 1$.

Further, in some embodiments of the present invention, the clamping member 26 may be located at an identical position relative to the tool holder 24 for the insert cutting angle's whole adjustment range.

As shown in FIG. 3, the tool holder 24 may extend along a longitudinal axis L in a forward to rearward direction F, R, and the cartridge receiving pocket 32 may open out to a forward end 44 of the tool holder 24.

In some embodiments of the present invention, the longitudinal axis L may be transverse to the upward and downward directions U, D.

Also, in some embodiments of the present invention, tool holder 24 may have an axis of rotation A2 coaxial with the longitudinal axis L, and the tool holder 24 may be rotatable about the axis of rotation A2.

Further, in some embodiments of the present invention, the insert cutting angle $\alpha 1$ may be a chamfer angle formed between a machined surface of the workpiece 34 and a lateral plane PL1 perpendicular to the axis of rotation A2, having a value between 10 and 80 degrees.

Figure 5:
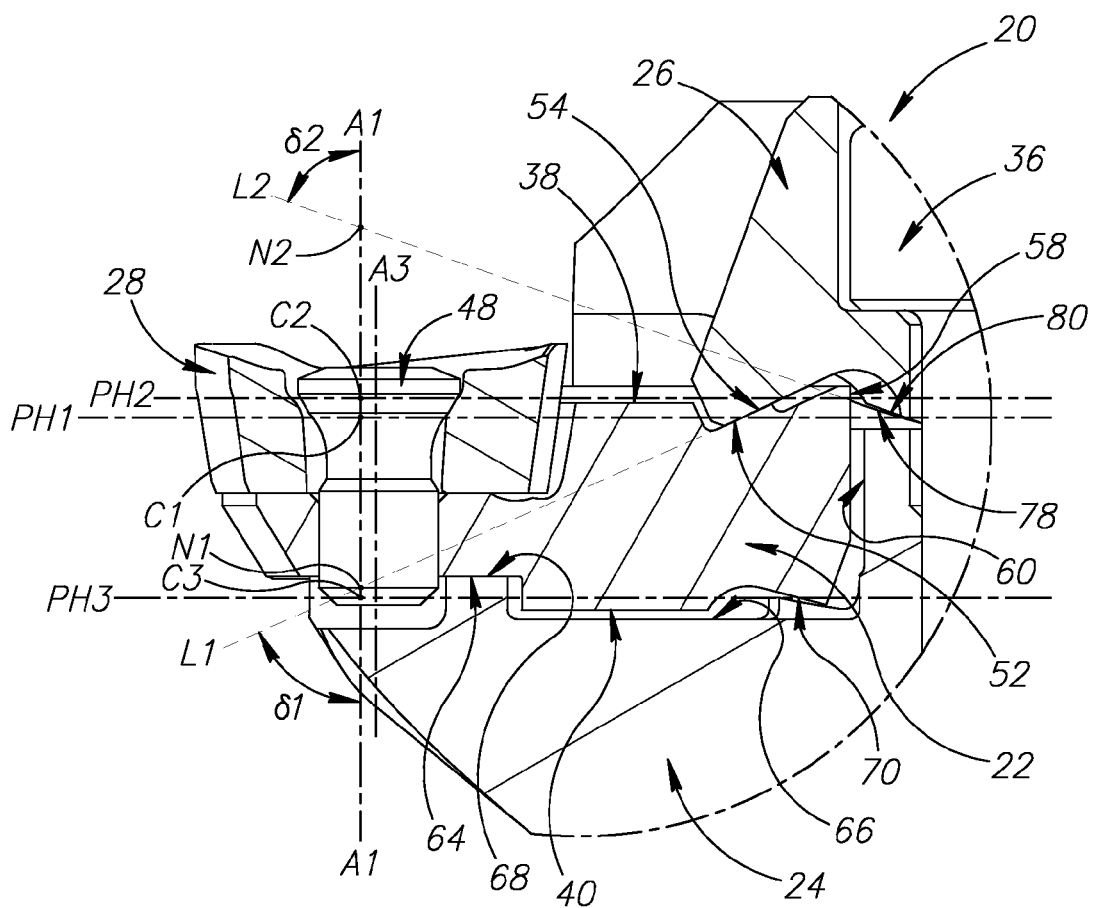
FIG. 5 is a detailed view of the cutting tool shown in FIG. 4.

As shown in FIGS. 2, 4 and 5, the cutting insert 28 may be removably retained in an insert receiving pocket 46 of the insert cartridge 22 by a retaining screw 48, and the retaining screw 48 may threadingly engage a threaded retaining bore 50 in the insert receiving pocket 46.

In some embodiments of the present invention, the insert receiving pocket 46 may be formed at the intersection of the upper and peripheral surfaces 38, 42 of the insert cartridge 22.

Also, in some embodiments of the present invention, the threaded retaining bore 50 may have a retaining bore axis A3 parallel to the pivot axis A1.

Further, in some embodiments of the present invention, the pivot axis A1 may intersect the insert receiving pocket 46.

Yet further, in some embodiments of the present invention, the retaining screw 48 may not threadingly engage the tool holder 24.

Configuring the cutting tool 20 such that the retaining screw 48 threadingly engages the insert cartridge 22 and not the tool holder 24 advantageously enables the cutting insert 28 to protrude beyond the forward end 44 of the tool holder 24 with sufficient relief to perform a wide range of machining operations, including, for example, chamfering of holes having relatively small diameters.

As shown in FIGS. 4 and 5, the clamping member 26 has a clamping surface 52 which makes contact with a non-planar clamped surface 54 of the insert cartridge 22.

In some embodiments of the present invention, the non-planar clamped surface 54 may be formed on the upper surface 38 of the insert cartridge 22.

Figure 6:
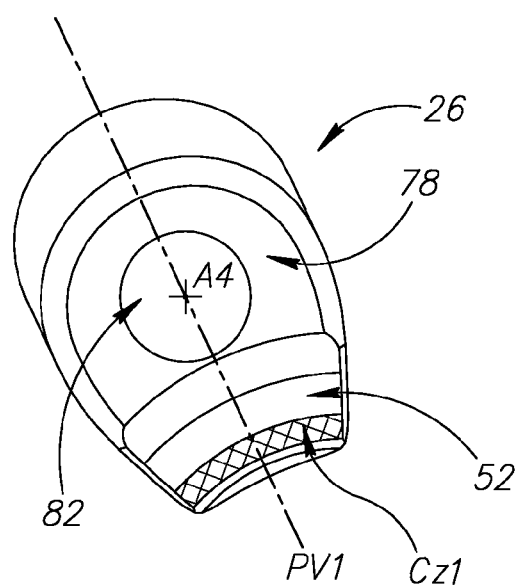
FIG. 6 is a bottom view of a clamping member in accordance with some embodiments of the present invention, in relation to a first vertical plane of the cutting tool.

As shown in FIG. 6, the clamping surface 52 has at least one clamping zone Cz1, and the same at least one clamping zone Cz1 makes contact with the clamped surface 54 for different values of insert cutting angle $\alpha 1$.

In some embodiments of the present invention, the same at least one clamping zone Cz1 may make contact with the clamped surface 54 for the insert cutting angle's whole adjustment range.

Configuring the cutting tool 20 such that the same at least one clamping zone Cz1 makes contact with the clamped surface 54 for the insert cutting angle's whole adjustment range, beneficially results in highly repeatable clamping of the insert cartridge 22.

In some embodiments of the present invention, as shown in FIG. 6, the at least one clamping zone Cz1 may exhibit mirror symmetry about the first vertical plane PV1.

Also, in some embodiments of the present invention, the clamping surface 52 may have exactly one clamping zone Cz1.

Figure 7:
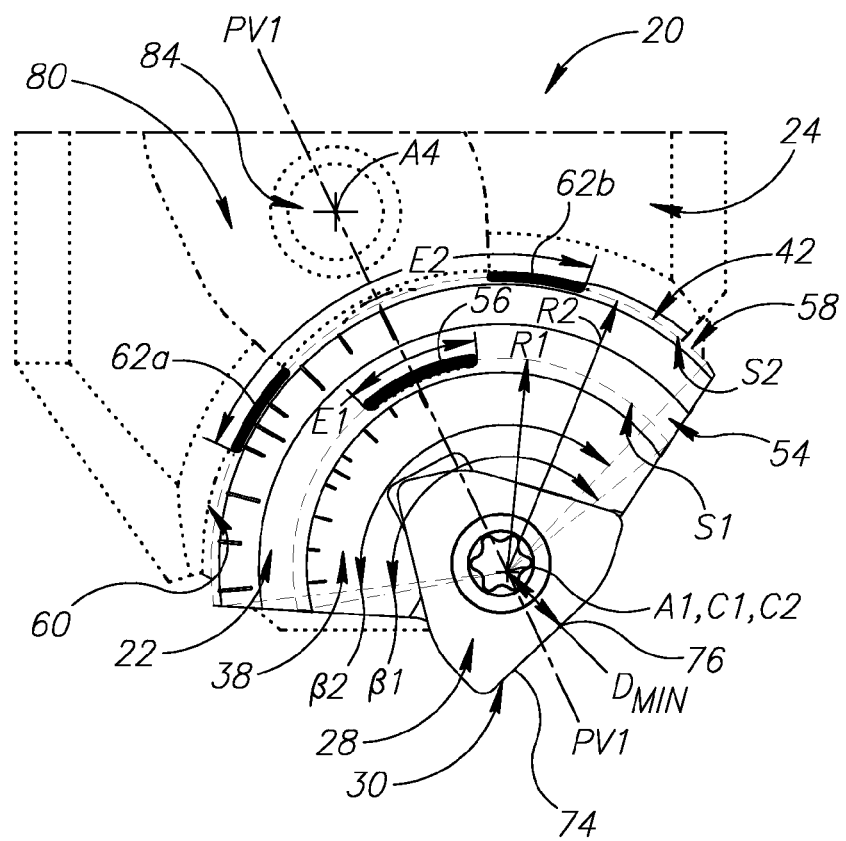
FIG. 7 is a top view of the cutting tool shown in FIG. 1, with the clamping member and a fastening member removed.

As shown in FIGS. 5 and 7, a first horizontal plane PH1 perpendicular to the pivot axis A1 may intersect the clamped surface 54 to form the arc of a first circular sector S1 having a first sector radius R1, and the first circular sector S1 may have a first center point C1 contained in the pivot axis A1.

In some embodiments of the present invention, the clamped surface 54 may have an arc shape when viewed along the pivot axis A1.

Also, in some embodiments of the present invention, the first circular sector S1 may subtend a first sector angle β1, and the first sector angle β1 may have a value of greater than 120 degrees.

Further, in some embodiments of the present invention, the arc of the first circular sector S1 may have at least one clamping arc portion 56 coinciding with the at least one clamping zone Cz1, and the at least one clamping arc portion 56 may have an angular clamping extent E1 about the pivot axis A1 having a value of greater than 20 degrees.

It should be appreciated throughout the detailed description and claims that the angular clamping extent E1 is measured between the two most spaced apart points along the at least one clamping arc portion 56.

As shown in FIG. 7, the peripheral surface 42 of the insert cartridge 22 may have a non-planar abutment surface 58 which makes contact with a side wall surface 60 of the cartridge receiving pocket 32.

Figure 8:
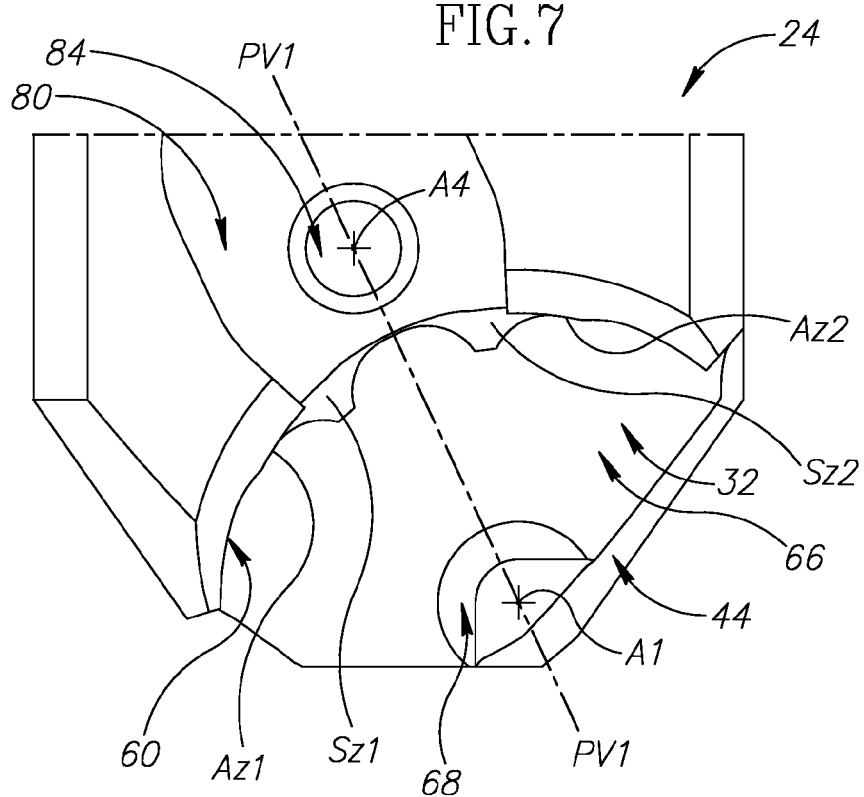
FIG. 8 is a top view of a tool holder in accordance with some embodiments of the present invention.

In some embodiments of the present invention, as shown in FIG. 8, the side wall surface 60 may have at least one abutment zone Az1, Az2, and the abutment surface 58 may make contact with the same at least one abutment zone Az1, Az2 for different values of insert cutting angle α1.

Also, in some embodiments of the present invention, the abutment surface 58 may make contact with the same at least one abutment zone Az1, Az2 for the insert cutting angle's whole adjustment range.

Configuring the cutting tool 20 such that the abutment surface 58 makes contact with the same at least one abutment zone Az1, Az2 for the insert cutting angle's whole adjustment range, beneficially results in highly repeatable clamping of the insert cartridge 22.

In some embodiments of the present invention, as shown in FIG. 8, the at least one abutment zone Az1, Az2 may exhibit mirror symmetry about the first vertical plane PV1.

Configuring the at least one clamping zone Cz1 and the at least one abutment zone Az1, Az2 to exhibit mirror symmetry about the first vertical plane PV1 advantageously results in a highly stable clamping arrangement.

In some embodiments of the present invention, the side wall surface 60 may have exactly two spaced apart abutment zones Az1, Az2.

In other embodiments of the present invention (not shown), the side wall surface 60 may have exactly one abutment zone.

The side wall surface 60 having exactly two spaced apart abutment zones Az1, Az2 improves the cutting tool's manufacturing efficiency and results in highly repeatable clamping of the insert cartridge 22.

As shown in FIGS. 5 and 7, a second horizontal plane PH2 perpendicular to the pivot axis A1 may intersect the abutment surface 58 to form the arc of a second circular sector S2 having a second sector radius R2, and the second circular sector S2 may have a second center point C2 contained in the pivot axis A1.

In some embodiments of the present invention, the abutment surface 58 may have an arc shape when viewed along the pivot axis A1.

Also, in some embodiments of the present invention, the second circular sector S2 may subtend a second sector angle β2, and the second sector angle β2 may have a value of greater than 120 degrees Further, in some embodiments of the present invention, the arc of the second circular sector S2 may have at least one abutment arc portion 62a, 62b coinciding with the at least one abutment zone Az1, Az2, and the at least one abutment arc portion 62a, 62b may have an angular abutment extent E2 about the pivot axis A1 having a value of greater than 50 degrees.

It should be appreciated throughout the detailed description and claims that the angular abutment extent E2 is measured between the two most spaced apart points along the at least one abutment arc portion 62a, 62b collectively.

In some embodiments of the present invention, the second horizontal plane PH2 may be located upward of the first horizontal plane PH1, and the at least one abutment arc portion 62a, 62b may be located upward of the at least one clamping arc portion 56.

The side wall surface 60 having exactly two spaced apart abutment zones Az1, Az2 is especially beneficial with respect to manufacturing efficiency and repeatable clamping, for cutting tool's configured with the angular abutment extent E2 having a value of greater than 50 degrees.

As shown in FIG. 5, the lower surface 40 of the insert cartridge 22 may have a planar first base surface 64 which makes contact with a seat surface 66 of the cartridge receiving pocket 32, and the seat surface 66 may be transverse to the side wall surface 60.

In some embodiments of the present invention, the first base surface 64 may be perpendicular to the pivot axis A1.

Also, in some embodiments of the present invention, the first base surface 64 may make contact with a single raised planar support portion 68 of the seat surface 66.

Further, in some embodiments of the present invention, the lower surface 40 may include a non-planar second base surface 70 which makes contact with the seat surface 66.

As shown in FIG. 8, the seat surface 66 may include at least one support zone Sz1, Sz2, and the second base surface 70 may make contact with the same at least one support zone Sz1, Sz2 for different values of insert cutting angle α1.

In some embodiments of the present invention, the second base surface 70 may make contact with the same at least one support zone Sz1, Sz2 for the insert cutting angle's whole adjustment range.

Also, in some embodiments of the present invention, as shown in FIG. 8, the at least one support zone Sz1, Sz2 may exhibit mirror symmetry about the first vertical plane PV1.

Further, in some embodiments of the present invention, the seat surface 66 may have exactly two spaced apart support zones Sz1, Sz2.

The seat surface 66 having the single raised planar support portion 68 and exactly two spaced apart support zones Sz1, Sz2 advantageously provides three-point support for the insert cartridge's lower surface 40 and thus a highly stable seating arrangement.

Figure 9:
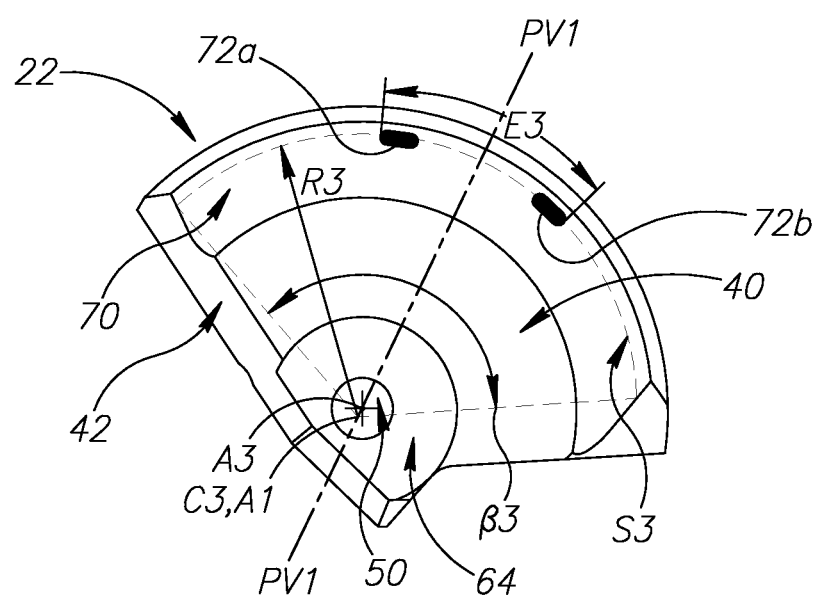
FIG. 9 is a bottom view of an insert cartridge in accordance with some embodiments of the present invention, in relation to the first vertical plane of the cutting tool.

As shown in FIGS. 5 and 9, a third horizontal plane PH3 perpendicular to the pivot axis A1 may intersect the second base surface 70 to form the arc of a third circular sector S3 having a third sector radius R3, and the third circular sector S3 may have a third center point C3 contained in the pivot axis A1.

In some embodiments of the present invention, the second base surface 70 may have an arc shape when viewed along the pivot axis A1.

Also, in some embodiments of the present invention, the second circular sector S3 may subtend a second sector angle β3, and the second sector angle β3 may have a value of greater than 120 degrees.

Further, in some embodiments of the present invention, the third sector radius R3 may be greater than the first sector radius R1.

Yet further, in some embodiments of the present invention, the arc of the third circular sector S3 may have at least one support arc portion 72a, 72b coinciding with the at least one support zone Sz1, Sz2, and the at least one support arc portion 72a, 72b may have an angular support extent E3 about the pivot axis A1 having a value of greater than 30 degrees.

It should be appreciated throughout the detailed description and claims that the angular support extent E3 is measured between the two most spaced apart points along the at least one support arc portion 72a, 72b collectively.

As shown in FIGS. 4 and 5, the second base surface 70 and the clamped surface 54 may form a dove-tail shape profile.

In some embodiments of the present invention, as shown in FIG. 7, each of the at least one cutting portion 30 may include a linear cutting edge 74, and the operative linear cutting edge 74 may have an edge point 76 located a minimum edge distance $D_{MIN}$ away from the pivot axis A1, and the second sector radius R2 may be greater than the minimum edge distance $D_{MIN}$.

Configuring the second sector radius R2 to be greater than the minimum edge distance $D_{MIN}$, advantageously limits the degree of spatial movement of the operative linear cutting edge 74 relative to the cartridge receiving pocket 32 throughout the insert cutting angle's adjustment range, thus enabling the cutting tool 20 to perform a wide range of machining operations, including, for example, chamfering of holes having relatively small diameters.

As shown in FIG. 5, a first imaginary straight line L1 coincident with or tangential to the clamped surface 54 may intersect the pivot axis A1 at a first intersection point N1.

In some embodiments of the present invention, the first intersection point N1 may be located downward of the clamped surface 54.

Also, in some embodiments of the present invention, the first imaginary straight line L1 may form a first acute angle δ1 with the pivot axis A1, and the first acute angle δ1 may have a value between 55 and 85 degrees.

It should be appreciated that for embodiments of the present invention where the first acute angle δ1 has a value between 55 and 85 degrees, clamping forces are directed to maintain stable contact between the lower and peripheral surfaces 40, 42 of the insert cartridge 22 and the seat and side wall surfaces 66, 60 of the cartridge receiving pocket 32, respectively, throughout a wide range of machining operations, solely by the clamping member 26.

As shown in FIG. 4, the fastening member 36 may non-threadingly engage the clamping member 26.

In some embodiments of the present invention, the clamping member 26 may have a fastening surface 78 which makes contact with a planar fastened surface 80 of the tool holder 24.

Also, in some embodiments of the present invention, the clamping member 26 may be of unitary one-piece construction.

Further, in some embodiments of the present invention, the fastened surface 80 may be adjacent the side wall surface 60.

As shown in FIG. 5, a second imaginary straight line L2 coincident with the fastened surface 80 may intersect the pivot axis A1 at a second intersection point N2.

In some embodiments of the present invention, the second intersection point N2 may be located upward of the fastened surface 80.

Also, in some embodiments of the present invention, the second imaginary straight line L2 may form a second acute angle δ2 with the pivot axis A1, and the second acute angle δ2 may have a value between 60 and 80 degrees.

It should be appreciated that for embodiments of the present invention where the second acute angle δ2 has a value between 60 and 80 degrees, clamping forces are directed to further maintain stable contact between the lower and peripheral surfaces 40, 42 of the insert cartridge 22 and the seat and side wall surfaces 66, 60 of the cartridge receiving pocket 32, respectively, throughout a wide range of machining operations.

As shown in FIG. 4, the fastening member 36 may not engage the insert cartridge 22.

Also, as shown in FIGS. 1 and 3, the fastening member 36 may be a fastening screw.

In some embodiments of the present invention, the fastening screw may be accessible from a direction transverse to the longitudinal axis L As shown in FIGS. 4 and 6, the clamping member 26 may have a through bore 82 intersecting the fastening surface 78, and the fastening screw may extend through the through bore 82 and threadingly engage a threaded fastening bore 84 in the fastened surface 80. The fastening bore 84 may have a fastening bore axis A4.

In some embodiments of the present invention, the fastening bore axis A4 may be contained in the first vertical plane PV1.

Also, in some embodiments of the present invention, the fastening bore axis A4 may be non-perpendicular to the fastened surface 80.

Further, in some embodiments of the present invention, the fastening bore axis A4 may not intersect the insert cartridge 22.

Yet further, in some embodiments of the present invention, the fastening bore axis A4 may be parallel to the pivot axis A1.

Although the present invention has been described to a certain degree of particularity, it should be understood that various alterations and modifications could be made without departing from the spirit or scope of the invention as hereinafter claimed.

What is claimed is:

1. An adjustable insert cutting angle cutting tool (20) comprising:
   a tool holder (24) having a cartridge receiving pocket (32),
   an insert cartridge (22) clamped in the cartridge receiving pocket (32) by a clamping member (26) operated by a separate fastening member (36), and
   a cutting insert (28) removably retained in the insert cartridge (22), the cutting insert having at least one operative cutting portion (30),
   the insert cartridge (22) oriented in the cartridge receiving pocket (32) so that the operative cutting portion (30) encounters a workpiece (34) at an insert cutting angle (α1),
   wherein the clamping member (26) has a clamping surface (52) which makes contact with a non-planar clamped surface (54) of the insert cartridge (22), wherein the insert cutting angle (α1) is increased or decreased by reorienting the insert cartridge (22) in the tool holder (24), following release of the fastening member (36), and wherein the clamping surface (52) has at least one clamping zone (Cz1), and the same at least one clamping zone (Cz1) makes contact with the clamped surface (54) for different values of insert cutting angle (α1).

2. The cutting tool (20) according to claim 1, wherein reorientation of the insert cartridge (22) in the cartridge receiving pocket (32) is performed by rotating the insert cartridge (22) about a pivot axis (A1), and wherein the pivot axis (A1) is contained in a first vertical plane (PV1).

3. The cutting tool (20) according to claim 2, wherein the pivot axis (A1) is in a fixed position relative to the tool holder (24).

4. The cutting tool (20) according to claim 2, wherein in a cross-section of the cutting tool (20) taken in the first vertical plane (PV1), a first imaginary straight line (L1) coincident with or tangential to the clamped surface (54) intersects the pivot axis (A1) at a first intersection point (N1).

5. The cutting tool (20) according to claim 2, wherein the at least one clamping zone (Cz1) exhibits mirror symmetry about the first vertical plane (PV1).

6. The cutting tool (20) according to claim 2, wherein a first horizontal plane (PH1) perpendicular to the pivot axis (A1) intersects the clamped surface (54) to form the arc of a first circular sector (S1) having a first sector radius (R1), and wherein the first circular sector (S1) has a first center point (C1) contained in the pivot axis (A1).

7. The cutting tool (20) according to claim 6, wherein the arc of the first circular sector (S1) has at least one clamping arc portion (56) coinciding with the at least one clamping zone (Cz1), wherein the at least one clamping arc portion (56) has an angular clamping extent (E1) about the pivot axis (A1), and wherein the angular clamping extent (E1) has a value of greater than 20 degrees.

8. The cutting tool (20) according to claim 2, wherein the cutting insert (28) is removably retained in an insert receiving pocket (46) of the insert cartridge (22) by a retaining screw (48), and wherein the retaining screw (48) threadingly engages a threaded retaining bore (50) in the insert receiving pocket (46).

9. The cutting tool (20) according to claim 8, wherein the retaining screw (48) does not threadingly engage the tool holder (24).

10. The cutting tool (20) according to claim 8, wherein the pivot axis (A1) intersects the insert receiving pocket (46).

11. The cutting tool (20) according to claim 2, wherein the insert cartridge (22) has opposing upper and lower surfaces (38, 40) generally facing in upward and downward directions (U, D), respectively, and a peripheral surface (42) extending therebetween, wherein the non-planar clamped surface (54) is formed on the upper surface (38), and wherein the peripheral surface (42) has a non-planar abutment surface (58) which makes contact with a side wall surface (60) of the cartridge receiving pocket (32).

12. The cutting tool (20) according to claim 11, wherein the side wall surface (60) has at least one abutment zone (Az1, Az2), and wherein the abutment surface (58) makes contact with the same at least one abutment zone (Az1, Az2) for different values of insert cutting angle (α1).

13. The cutting tool (20) according to claim 12, wherein the at least one abutment zone (Az1, Az2) exhibits mirror symmetry about the first vertical plane (PV1).

14. The cutting tool (20) according to claim 12, wherein a second horizontal plane (PH2) perpendicular to the pivot axis (A1) intersects the abutment surface (58) to form the arc of a second circular sector (S2) having a second sector radius (R2), and wherein the second circular sector (S2) has a second center point (C2) contained in the pivot axis (A1).

15. The cutting tool (20) according to claim 14, wherein the arc of the second circular sector (S2) has at least one abutment arc portion (62a, 62b) coinciding with the at least one abutment zone (Az1, Az2), wherein the at least one abutment arc portion (62a, 62b) has an angular abutment extent (E2) about the pivot axis (A1), and wherein the angular abutment extent (E2) has a value of greater than 50 degrees.

16. The cutting tool (20) according to claim 14, wherein each of the at least one cutting portion (30) includes a linear cutting edge (74), wherein the operative linear cutting edge (74) has an edge point (76) located a minimum edge distance ($D_{MIN}$) away from the pivot axis (A1), and wherein the second sector radius (R2) is greater than the minimum edge distance ($D_{MIN}$).

17. The cutting tool (20) according to claim 11, wherein the clamping member (26) has a fastening surface (78) which makes contact with a planar fastened surface (80) of the tool holder (24), and wherein in a cross-section of the cutting tool (20) taken in the first vertical plane (PV1), a second imaginary straight line (L2) coincident with the fastened surface (80) intersects the pivot axis (A1) at a second intersection point (N2), and wherein the second intersection point (N2) is located upward of the fastened surface (80).

18. The cutting tool (20) according to claim 17, wherein the clamping member (26) has a through bore (82) intersecting the fastening surface (78), wherein the fastening member (36) is a fastening screw, and wherein the fastening screw extends through the through bore (82) and threadingly engages a threaded fastening bore (84) in the fastened surface (80), the fastening bore (84) having a fastening bore axis (A4).

19. The cutting tool (20) according to claim 18, wherein the fastening bore axis (A4) is contained in the first vertical plane (PV1).

20. The cutting tool (20) according to claim 18, wherein the fastening bore axis (A4) is non-perpendicular to the fastened surface (80).

21. The cutting tool (20) according to claim 18, wherein the fastening bore axis (A4) does not intersect the insert cartridge (22).

22. The cutting tool (20) according to claim 11, wherein in a cross-section of the cutting tool (20) taken in the first vertical plane (PV1), a first imaginary straight line (L1) coincident with or tangential to the clamped surface (54) intersects the pivot axis (A1) at a first intersection point (N1), and wherein the first intersection point (N1) is located downward of the clamped surface (54).

23. The cutting tool (20) according to claim 11, wherein the lower surface (40) has a planar first base surface (64) which makes contact with a seat surface (66) of the cartridge receiving pocket (32), wherein the seat surface (66) is transverse to the side wall surface (60), and wherein the first base surface (64) is perpendicular to the pivot axis (A1).

24. The cutting tool (20) according to claim 1, wherein the fastening member (36) non-threadingly engages the clamping member (26).

25. The cutting tool (20) according to claim 1, wherein the fastening member (36) does not engage the insert cartridge (22).

26. The cutting tool (20) according to claim 1, wherein the clamping member (26) is located at an identical position relative to the tool holder (24) for different values of insert cutting angle ($\alpha 1$).

27. The cutting tool (20) according to claim 1, wherein the insert cutting angle ($\alpha 1$) is increased or decreased solely following release of the fastening member (36), and wherein a single fastening member (36) is used to operate the clamping member (26).

28. The cutting tool (20) according to claim 1, wherein the tool holder (24) extends along a longitudinal axis (L) in a forward to rearward direction (F, R), and wherein the holder receiving pocket (32) opens out to a forward end (44) of the tool holder (24).

29. The cutting tool (20) according to claim 28, wherein tool holder (24) has an axis of rotation (A2) coaxial with the longitudinal axis (L), and wherein the tool holder (24) is rotatable about the axis of rotation (A2).

30. The cutting tool (20) according to claim 28, wherein the fastening member (36) is a fastening screw, and wherein the fastening screw is accessible from a direction transverse to the longitudinal axis (L).

31. A method of increasing or decreasing an insert cutting angle ($\alpha 1$) of a cutting tool (20) relative to a workpiece (34), the cutting tool (20) comprising:

an insert cartridge (22) clamped in a tool holder (24) by a clamping member (26), and a cutting insert (28) removably retained in the insert cartridge (22), the clamping member (26) having a clamping surface (52) which makes contact with a non-planar clamped surface (54) of the insert holder (24), the clamping member (26) operated by a separate fastening member (36), the clamping surface (52) having at least one clamping zone (Cz1), and the same at least one clamping zone (Cz1) making contact with the clamped surface (54) for different values of insert cutting angle ($\alpha 1$), the cutting insert (28) having at least one operative cutting portion (30), and the insert cartridge (22) oriented in a cartridge receiving pocket (32) of the tool holder (24) so that the operative cutting portion (30) encounters a workpiece (34) at the insert cutting angle ($\alpha 1$), the method comprising the steps of:

releasing the fastening member (36), reorienting the insert cartridge (22) in the cartridge receiving pocket (32), and retightening the fastener (36).

32. The method according to claim 31, wherein reorientation of the insert cartridge (22) in the cartridge receiving pocket (32) is performed by rotating the insert cartridge (22) about a pivot axis (A1), and wherein the pivot axis (A1) is contained in a first vertical plane (PV1).

33. The method according to claim 31, wherein the insert cartridge (22) has opposing upper and lower surfaces (38, 40) and a peripheral surface (42) extending therebetween, wherein the non-planar clamped surface (54) is formed on the upper surface (38), and wherein the peripheral surface (42) has a non-planar abutment surface (58) which makes contact with a side wall surface (60) of the cartridge receiving pocket (32).

34. The method according to claim 33, wherein the side wall surface (60) has at least one abutment zone (Az1, Az2), and wherein the abutment surface (58) makes contact with the same at least one abutment zone (Az1, Az2) for different values of insert cutting angle ($\alpha 1$).

* * * * *